United States Patent
Tischler

(12) 
(10) Patent No.: US 6,712,096 B1
(45) Date of Patent: Mar. 30, 2004

(54) HIGH PRESSURE ATTENUATOR

(75) Inventor: Dieter Tischler, Carl Junction, MO (US)

(73) Assignee: KMT Waterjet Systems, Inc., Baxter Springs, KS (US)

( * ) Notice: Subject to any disclaimer, the term of this patent is extended or adjusted under 35 U.S.C. 154(b) by 0 days.

(21) Appl. No.: 10/353,474

(22) Filed: Jan. 29, 2003

(51) Int. Cl.⁷ ................................................ F16L 55/04
(52) U.S. Cl. .......................................... 138/30; 138/91
(58) Field of Search .............................. 138/26, 30, 89, 138/90, 91

(56) References Cited

U.S. PATENT DOCUMENTS

| | | | |
|---|---|---|---|
| 787,466 A | | 4/1905 | Preece |
| 1,250,603 A | * | 12/1917 | Loepsinger ............... 138/90 |
| 1,835,963 A | | 12/1931 | Nevius |
| 2,213,161 A | | 8/1940 | Ericsson |
| 2,519,770 A | | 8/1950 | Kramer |
| 3,256,069 A | | 6/1966 | Peterson |
| 3,568,379 A | | 3/1971 | Johnsson et al. |
| 4,660,687 A | * | 4/1987 | Williams et al. ........... 188/287 |
| 4,927,305 A | * | 5/1990 | Peterson, Jr. ................ 411/14 |
| RE33,490 E | * | 12/1990 | Steinbock .................. 29/116.2 |
| 5,075,950 A | * | 12/1991 | Steinbock .................. 29/426.5 |
| 5,083,889 A | * | 1/1992 | Steinbock .................. 411/432 |
| 6,112,396 A | | 9/2000 | Steinbock |
| 6,263,764 B1 | | 7/2001 | Steinbock |
| 6,381,827 B1 | | 5/2002 | Steinbock |

OTHER PUBLICATIONS

Superbolt, Inc., Carnegie, PA—catalog pages titled "The Solution to Bolting Problems" (1 Page) and "The Laws of Physics Work for You" (1 Page), Catalog Data 1–99.
Superbolt, Inc., Carnegie, PA—Catalog titled "The Solution to Bolting Problems", Catalog Date 5–02, 32 pages.
UHDE High Pressure Technologies, GmbH—Catalog titled "High Pressure is Our World . . . up to 14000 bar", May 2003, 24 pages.
UHDE Intensifier Design (Circa 1960), 1 page. Dec. 1999.
High Pressure Equipment Company, Erie, PA—Catalog Table of Contents (1 page); Section 10 titled "Pressure Vessels and Reactors" (12 pages), and Section 11 titled "Pumping Systems, Intensifiers, Gas Boosters and High Pressure Generators" (9 pages), individual revision pages dated 12/97 to 2/02.

* cited by examiner

*Primary Examiner*—James Hook
(74) *Attorney, Agent, or Firm*—Michael Best & Friedrich LLP

(57) ABSTRACT

A high-pressure attenuator or accumulator includes a body defining a pressure chamber therein. An engaging wall of the body extends axially beyond an opening to the pressure chamber and defines a sealing chamber therein. A seal head positioned within the sealing chamber is coupled to the attenuator body using a tensioner assembly coupled to the engaging wall.

13 Claims, 3 Drawing Sheets

HIGH PRESSURE ATTENUATOR

BACKGROUND OF THE INVENTION

The present invention relates to high-pressure fluid systems and particularly to attenuators or accumulators for absorbing pressure spikes in high-pressure fluid systems.

Conventional high-pressure fluid systems utilize attenuators or accumulators that absorb pressure spikes created in the system when a piston, which creates the pressure in the system, is driven back and forth. A typical attenuator or accumulator provides within the system a volume of fluid large enough to dampen pressure fluctuations present in fluid entering one end of the attenuator. The attenuator then delivers fluid from the other end of the attenuator at a more constant pressure.

SUMMARY OF THE INVENTION

The walls of high-pressure attenuators or accumulators must withstand great stresses due to internal pressure. Typical attenuators or accumulators include an accumulator body having a pressure chamber that is sealed off with a seal head coupled to an end of the accumulator body. Often the seal head is coupled to the attenuator body using fasteners that protrude into the attenuator body beyond the end of the pressure chamber. The high pressures under which high-pressure attenuators or accumulators operate, coupled with the presence of fasteners that extend into the wall of the accumulator body beyond the end of the pressure chamber, can create stress raisers within the accumulator walls causing cracks and fatigue problems.

According to the present invention, an attenuator for high-pressure system comprises a body defining a pressure chamber therein. At least one end of the body includes an opening to the pressure chamber. The attenuator also includes an engaging wall extending from the housing beyond the opening to the pressure chamber. The engaging wall defines a sealing chamber therein. A seal head is positioned within the sealing chamber and seals the opening to the pressure chamber. The seal head includes a passageway therethrough for the passage of fluid from the pressure chamber. A tensioner is threadedly coupled to the engaging wall and positioned around the passageway within the sealing chamber. A plurality of jackbolts are threaded through the tensioner and include ends contacting the seal head to bias the seal head against the opening to the pressure chamber.

In preferred embodiments, the tensioner includes threads on an outer threaded surface of the tensioner which engage mating threads on an inner threaded surface of the engaging wall. The jackbolts, threaded through the tensioner, push against a lateral face of the seal head forcing an engaging face of the seal head into engagement with a wedge surface surrounding the opening to the pressure chamber, thereby sealing the opening to the pressure chamber.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
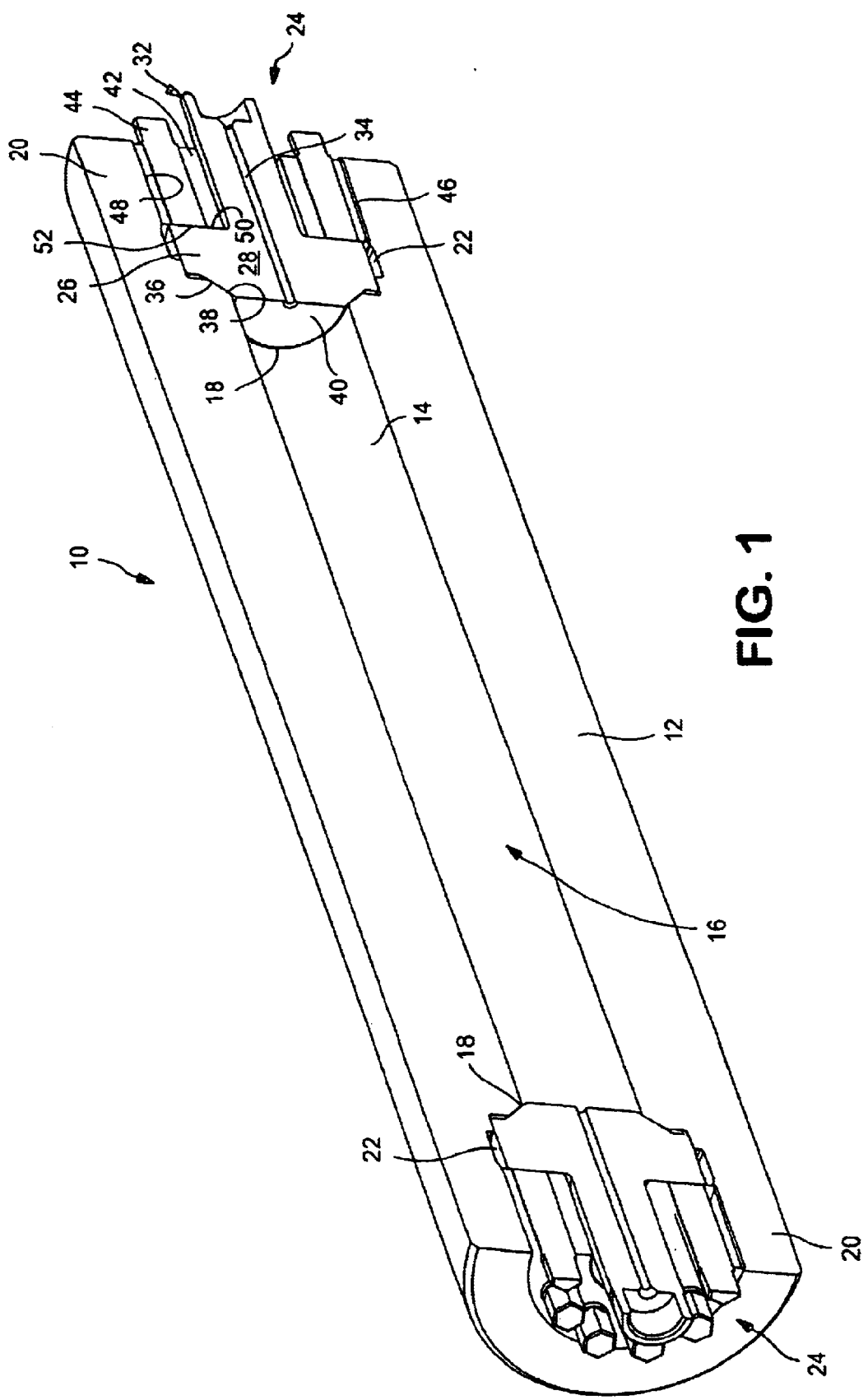
FIG. 1 is a perspective sectional view of an attenuator or accumulator according to the present invention including an attenuator body having a pressure chamber therein sealed on each end by a seal head.
Figure 2:
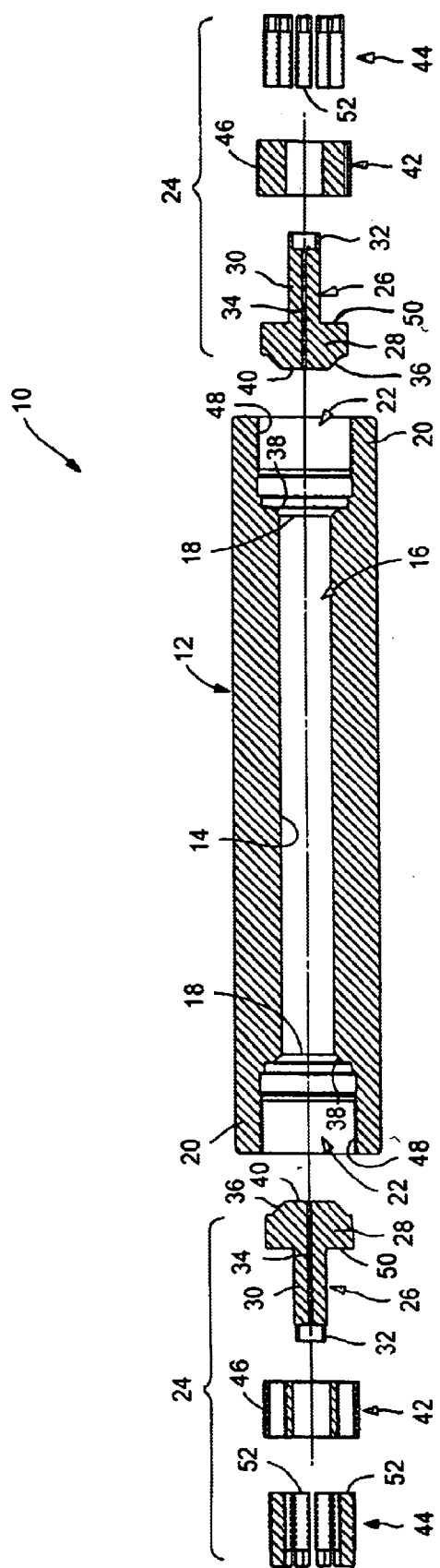
FIG. 2 is an exploded sectional view of the attenuator of FIG. 1.

Referring to FIGS. 1 and 2, an attenuator or accumulator 10 according to the present invention includes a body 12 having an interior body surface 14 defining a pressure chamber 16. The body 12 includes an opening 18 at each end of the pressure chamber 16. The body 12 is formed to include an engaging wall 20 extending axially at each end of the body 12 beyond the opening 18. In this way, the engaging wall 20 surrounds and defines a sealing chamber 22.

In operation, the pressure chamber 16 is used to hold a volume of fluid that absorbs or attenuates pressure fluctuations in a flow of fluid through a high-pressure system that includes the attenuator or accumulator 10. To seal the pressure chamber 16 sufficiently to withstand the high pressures that exist within the pressure chamber 16, the attenuator or accumulator 10 includes a sealing assembly 24 at each end of the accumulator or attenuator 10. As described above, and as discussed in more detail below, the attenuator or accumulator 10 is identical at both ends and the sealing assemblies 24 used to seal each end of the pressure chamber 16 are identical. However, different sealing assemblies that cooperate with different end formations of the accumulator body 12 could be used at one end of the attenuator or accumulator 10 and still be within the scope and spirit of the present invention. In other words, the sealing assembly 24, as described in more detail below, is shown in use at both ends of the attenuator or accumulator 10, but need only be used at one end of the attenuator or accumulator 10 and still be within the scope and spirit of the present invention.

According to the present invention, the sealing assembly 24 includes a seal head 26 positioned within the sealing chamber 22. The seal head 26 includes a tapered body portion 28 and a shaft portion 30 extending therefrom. The shaft portion 30 includes a connector 32 at one end, which provides a high pressure connection point for a tube (not shown) carrying a fluid to the attenuator or accumulator 10. The connector 32 provides an inlet to a passageway 34 through the seal head 26 and to the pressure chamber 16. The tapered body portion 28 of the seal head 26 includes a tapered engaging face 36 that mates with a wedge surface 38 extending from the opening 18 and angling toward the engaging wall 20. With the tapered engaging face 36 mating with the wedge surface 38, a plug end 40 of the seal head 26 is firmly positioned in the pressure chamber 16, thereby sealing the opening 18.

The seal head 26 is held in sealing engagement with a tensioner ring 42 and a plurality of jackbolts 44. The tensioner ring 42 includes an outer threaded surface 46 that threadedly engages an inner threaded surface 48 of the engaging wall 20 (best seen in FIG. 2). In this way, the tensioner ring 42 is screwed into the sealing chamber 22 and abuts a lateral face 50 of the seal head 26. Next, by screwing a plurality of jackbolts 44 through the tensioner ring 42, the seal head is held in engagement with the opening 18 to create a high-pressure closure at the end of the pressure chamber 16. The jackbolts 44 are threaded through the tensioner ring 42 and include contacting ends 52 that engage the lateral face 50 of the seal head 26. Tightening the jackbolts 44 drives the seal head 26 into engagement with the opening 18 against the counter force created by the tensioner ring 42 and its threaded engagement with the engaging wall 20. By successively tightening each of the jackbolts 44 (there are a total of five jackbolts 44 shown in the cross-section of FIG. 1, which would translate into ten total jackbolts in the complete attenuator or accumulator 10), a great overall force can be applied to the seal head 26 creating a high pressure seal at the opening 18. As will be readily apparent to one of ordinary skill in the art, the number of jackbolts may be varied.

As mentioned above, the sealing assembly 24 is positioned in the sealing chamber 22, which is bounded by the engaging wall 20. As also mentioned above, the engaging wall 20 extends axially beyond the opening 18. In this way, the stresses from the sealing assembly 24 are placed in areas of the body 12 (e.g., the engaging wall 20) removed or remote from the areas of the body 12 that experience stress due to the pressure in the pressure chamber 16.

Figure 3:
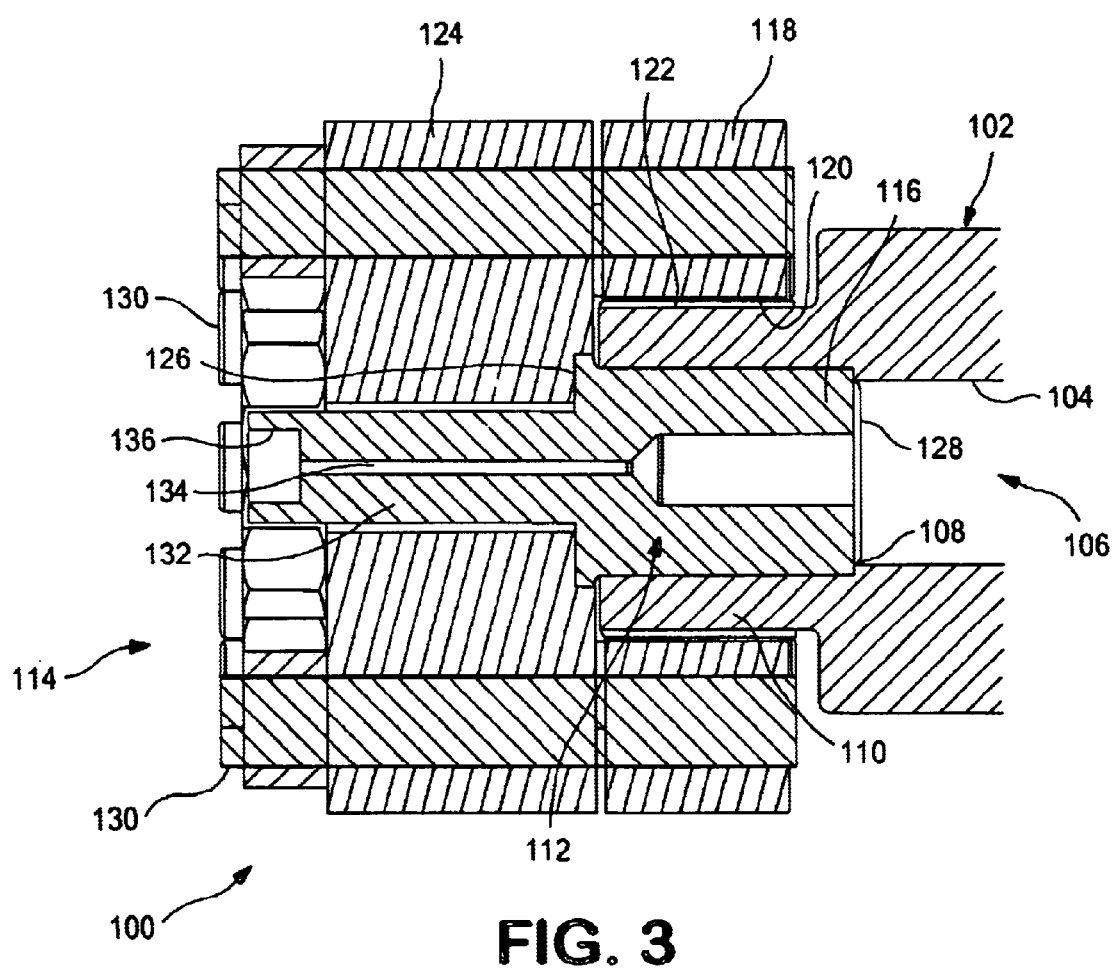
FIG. 3 is a sectional view of another construction of an attenuator or accumulator according to the present invention.

Referring to FIG. 3, a sealing assembly 114 of a second construction of an attenuator or accumulator 100 according to the present invention is shown. As with the attenuator 10, the attenuator 100 includes a body 102 having an interior body surface 104 defining a pressure chamber 106 within the body 102. The pressure chamber 106 is open at both ends through openings 108 in the body 102. Also as with attenuator 10, the body 102 of the attenuator 100 in formed to include an engaging wall 110 surrounding the opening 108 and extending axially therefrom. The engaging wall 110 surrounds and defines a sealing chamber 112 therein. The sealing assembly 114 seals the opening 108 to the pressure chamber 106 and includes a seal head 116 positioned within the sealing chamber 112.

Unlike the attenuator 10, the attenuator 100 includes a tensioner ring 118 that has an inner threaded surface 120 that engages an outer threaded surface 122 on the engaging wall 110. In this way, the tensioner ring 118 surrounds the engaging wall 110 and is thus coupled to its outer surface 122, in contrast to the tensioner ring 42 of the attenuator 10, which is coupled to an inner surface 48 of the engaging wall 20. An end ring 124 engages a lateral face 126 of the seal head 116 to force a plug end 128 of the seal head 116 into sealing engagement with the opening 108. The end ring 124 is biased against the later face 126 of the seal head 116 using a plurality of studs 130 extending through the end ring 124 and threaded into the tensioner ring 118. In this way, tightening the studs 130 draws the end ring 124 toward the tensioner ring 118, pushing the end ring 124 against the lateral face 126 of the seal head 116.

A shaft portion 132 of the seal head 116 passes through the end ring 124 and includes a passageway 134 extending axially therethrough, thus providing a flow path to or from the pressure chamber 106. A connector 136 at the end of the shaft portion 132 provides a means for connecting the attenuator 100 to a tube or other suitable conduit of the high-pressure system.

Although the invention has been described in detail with reference to certain preferred embodiments, variations and modifications exist within the scope and spirit of the invention as described and defined in the following claims.

What is claimed is:

1. An attenuator for a high pressure fluid system comprising:
   a body defining a pressure chamber therein, at least one end of the body including an opening to the pressure chamber and having an engaging wall extending axially beyond the opening to the pressure chamber, the engaging wall defining a sealing chamber therein;
   a seal head positioned within the sealing chamber and sealing the opening to the pressure chamber, the seal head including a tapered engaging face that abuts a wedge surface surrounding the opening and having a passageway there through for the passage of a fluid from the pressure chamber;
   a tensioner positioned around the passageway within the sealing chamber; and
   a plurality of jackbolts threaded through the tensioner, at least one of the jackbolts having an end contacting the seal head to bias the seal head against the opening to the pressure chamber.

2. The attenuator of claim 1, wherein the end of the at least one of the jackbolts contacts a lateral face of the seal head and the engaging wall extends axially beyond the lateral face.

3. The attenuator of claim 1, wherein the seal head has a substantially circular cross-section.

4. An attenuator for a high pressure fluid system comprising:
   a body defining a pressure chamber therein, at least one end of the body including an opening to the pressure chamber and having an engaging wall extending axially beyond the opening to the pressure chamber, the engaging wall defining a sealing chamber therein;
   a seal head positioned within the sealing chamber and sealing the opening to the pressure chamber, the seal head including a tapered engaging face that abuts a wedge surface surrounding the opening and having a passageway there through for the passage of a fluid from the pressure chamber;
   a tensioner threadedly coupled to the engaging wall and positioned around the passageway within the sealing chamber; and
   a plurality of jackbolts threaded through the tensioner, at least one of the jackbolts having an end contacting the seal head to bias the seal head against the opening to the pressure chamber.

5. The attenuator of claim 4, wherein the end of the at least one of the jackbolts contacts a lateral face of the seal head and the engaging wall extends axially beyond the lateral face.

6. An attenuator for a high pressure fluid system comprising:
   a body defining a pressure chamber therein, at least one end of the body including an opening to the pressure chamber and having an engaging wall extending axially beyond the opening to the pressure chamber, the engaging wall defining a sealing chamber therein and having an outside surface;
   a seal head positioned within the sealing chamber and sealing the opening to the pressure chamber, the seal head having a passageway there through for the passage of a fluid from the pressure chamber;
   a tensioner ring positioned around the outside surface of the engaging wall; and
   an end ring positioned around the passageway and coupled to the tensioner ring with a plurality of fasteners that are threaded into the tensioner ring to bias the end ring against the seal head, thereby biasing the seal head against the opening to the pressure chamber.

7. The attenuator of claim 6, wherein the tensioner is threadedly coupled to the engaging wall.

8. The attenuator of claim 7, wherein the seal head includes a tapered engaging face that abuts a surface surrounding the opening.

9. The attenuator of claim 8, wherein the engaging wall extends axially beyond a plug end of the seal head.

10. The attenuator of claim 6, wherein the seal head includes a tapered engaging face that abuts a surface surrounding the opening.

11. The attenuator of claim 6, wherein the engaging wall extends axially beyond a plug end of the seal head.

12. The attenuator of claim 6, wherein the seal head has a substantially circular cross-section.

13. An attenuator for a high pressure fluid system comprising:

a body defining a pressure chamber therein, the body including at least one opening to the pressure chamber toward an end of the body and an engaging wall extending axially beyond the opening and defining a sealing chamber therein;

a seal head positioned within the sealing chamber and including a plug end; and a tensioner coupled to the engaging wall and biasing the seal head axially toward the pressure chamber, the tensioner positioned to lie axially away from the pressure chamber relative to the plug end and including a tensioner ring threadedly coupled to the engaging wall, and an end ring coupled to the tensioner ring with a plurality of fasteners that are threaded into the tensioner ring to bias the end ring against the seal head, thereby biasing the seal head axially toward the pressure chamber.

* * * * *